March 25, 1952 J. HAJDU 2,590,175
FASTENING DEVICE
Filed Aug. 20, 1949

INVENTOR.
JULIUS HAJDU
BY
Brockman & Schnurmaker
ATTORNEYS

Patented Mar. 25, 1952

2,590,175

UNITED STATES PATENT OFFICE 2,590,175

FASTENING DEVICE

Julius Hajdu, Cleveland, Ohio

Application August 20, 1949, Serial No. 111,491

1 Claim. (Cl. 24—211)

This invention relates to an improvement in fastening and connecting devices and particularly to a unitary sheet metal clip designed for use with a cooperating stud in the manner of a nut device for securing the parts of an assembly.

The primary object of this invention is to provide a device of the type stated that can be easily and quickly assembled without the use of any tools, and as easily released.

Another object is to provide a clip that can be used to join two elements together with equal facility from either side.

A further object is to provide a clip and stud assembly that is unobtrusive in appearance and without any projecting elements to break the continuity of the surfaces with which it is associated or to be snagged or damaged by foreign objects coming into contact with it.

Still another object is to provide a device of the type stated that can be economically stamped and shaped from a single piece of sheet material thereby lending itself to mass production methods in manufacture.

These and other objects of the invention will become apparent from a reading of the following specification and claim together with the accompanying drawing wherein like parts are referred to and indicated by like reference characters and wherein:

Figure 1:
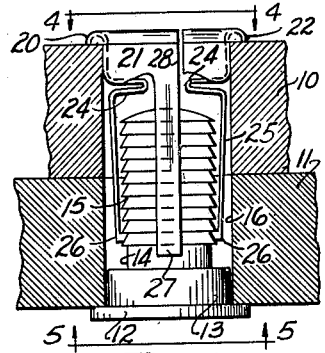
Figure 1 is a cross-sectional view through two elements being held together by the fastener constituting the invention, showing the clip with its toothed fingers in locked engagement with the stud.
Figure 2:
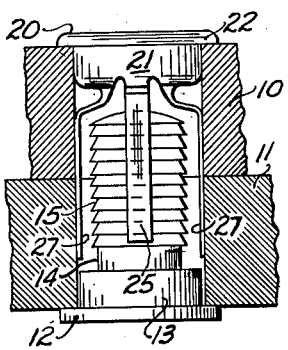
Figure 2 is a view of the same parts and elements shown in the Figure 1 but revolved ninety degrees.

With particular reference to the drawing: Figures 1-4, 6 and 7 show the general construction of the improved clip 20 which may be produced at a very low cost from a relatively small, inexpensive blank of any suitable sheet material, preferably spring metal or cold-rolled metal having spring-like characteristics.

Figure 8:
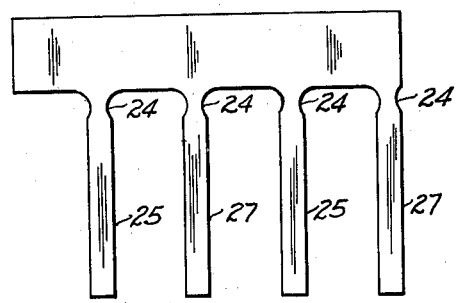
Figure 8 is a top plan view of the stamped sheet metal blank used in making the clip as it appears prior to the shaping operation.

The clip is best produced from a relatively small rectangular blank, as shown in the Figure 8, which may be obtained at a low cost from ordinary sheet metal strip stock with a minimum loss or waste of material.

The flat blank shown in the Figure 8 is formed into a cylinder and pressed into shape. Reference character 21 indicates a vertical walled head portion having an outwardly rolled peripheral flange or rim 22. The blank is constricted in the area of the trigger elements 24, as shown in the Figure 8, to impart a cup-like shape to the head as shown in the Figures 1, 2, 3, 4, 6, and 7.

Figure 4:
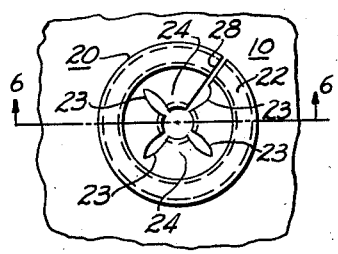
Figure 4 is a top plan view of the clip taken along the line and in the direction of the arrows 4—4 of the Figure 1.
Figure 5:
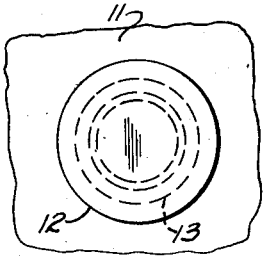
Figure 5 is a bottom plan view of the engaged stud taken along the line and in the direction of the arrows 5—5 of the Figure 1.

The bottom of the formed head, as seen in the Figure 4, has four radial slots 23 that divide the bottom into four triangularly shaped areas that are folded back upon themselves to form the paired and yieldable trigger elements 24. The metal at the outer portion of the trigger elements 24 is bent downward to form two pairs of dependent fingers 25 and 27. The pair of fingers designated by reference character 25 differ from the pair indicated by reference character 27 in that each of the fingers 25 has an inwardly extending tooth 26 formed at the lower end thereof, whereas, the fingers 27 are toothless. Furthermore, the fingers 25 are bent inwardly to normally act to approach one another at their lower ends while the fingers 27 normally tend to spring away from one another at their lower ends.

The clip 20, whose structure has just been disclosed, is intended to co-operate with a bolt or stud 12 in securing any two or more parts, 10 and 11, in an assembly in clamped engagement, as shown in the Figures 1, 2, 3 and 6.

In the present example, the stud 12 is shown in a preferred form comprising a head having a shoulder 13 and a ring-barbed shank 14 having a plurality of spaced grooves 15 therearound. The diameter of the shank 14 is less than the diameter of the shoulder 13 as shown in the Figure 7.

In securing the two parts 10 and 11 together, as shown in the example given in the drawing, the parts are positioned so that the assembly hole 16 in each part is aligned to form a single continuous bore. The stud 12 is inserted from the bottom with the shoulder 13 snugly seated in the bore 16. Inasmuch as the grooved shank 14 is of lesser diameter than the stud shoulder 13 a tubular cavity is created in the bore 16 between the bore wall and the shank. The clip 20 is inserted through the top or opposite end of the hole 16, with the fingers 25 and 27 surrounding the stud shank 14. The clip is then pushed down as far as it will go to take the position indicated in Figures 1, 2 and 6. The resiliency of the two fingers 25 and their associated triggers 24 force the teeth 26 into locked engagement with one of the shank grooves 15, while at the same time, the centering fingers 27 are pressed against the bore wall 16. The head 21 fits snugly in the bore 16 and the peripheral flange or rim 22 engages the top surface of the part 10. The ends of the blank used to form the clip are spaced apart slightly and form the slit 28. Thus the head may be slightly compressed against the resiliency of the metal to ensure a permanently snug fit.

The parts thus joined are firmly held by the clip 20 and the stud 12 which are securely locked together by means of the toothed fingers 25. The assembled fastener has a pleasing appearance with all the interlocking parts concealed in the hole 16. The clip 20 when viewed from above appears as a cup-shaped eyelet with only a low rolled brim extending above the surface. On the under side the stud presents only the smooth head to the exterior.

Figure 3:
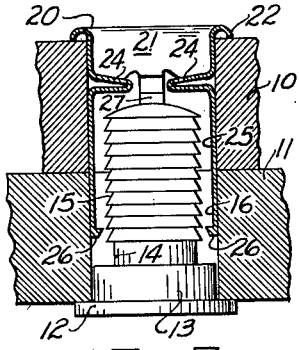
Figure 3 is a view similar to that shown in the Figure 1 but with the clip and stud in a disengaged position.
Figure 6:
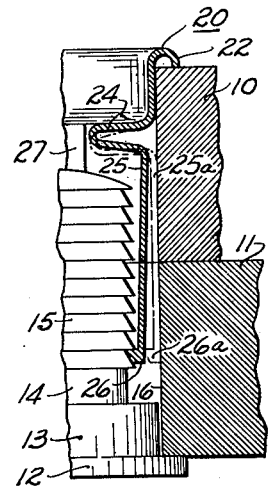
Figure 6 is an enlarged vertical sectional view taken along the line and in the direction of the arrows 6—6 of the Figure 4 and also showing in phantom lines the clip in its alternate released condition.
Figure 7:
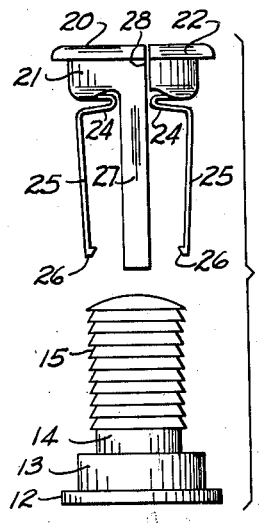
Figure 7 is an exploded view of the clip and stud assembly.

To disengage the clip and stud in order to dismantle the engaged parts 10 and 11 it is only necessary to press the resilient trigger elements 24 downward which causes the fingers 25 to move radially outward as shown in the Figures 3 and 6. The outward movement of each of the paired fingers 25 causes its tooth 26 to become disengaged from the stud groove 15 and take the alternate position indicated by reference character 26a in the Figure 6. The stud 12 being free of the teeth 26 can then be easily removed.

It will be noted by looking at the Figure 4 that the trigger elements 24 do not quite meet at their apices and therefor are free to move vertically. The triggers 24 can be depressed to release the fingers 25 by inserting a rod or stick in the cup-shaped head 21 and pushing downward. No special tool is needed for this purpose.

The clip cannot be accidentally released because any pressure against the head 21 on its brim 22 will not effect the releasing triggers 24 which are well protected in the bottom of the cup-shade head.

It will now be clear that there has been provided a device that accomplishes the objectives heretofore set forth. While the invention has been disclosed in its preferred form, it is to be understood that the specific embodiment thereof as described and illustrated herein is not to be considered in a limited sense as there may be other forms or modifications of the invention which should also be construed to come within the scope of the appended claim.

I claim:

A separable fastening device for joining objects of appreciable thickness having aligned holes therethrough, comprising in combination, a stud member including a shouldered head adapted to interfit one end of one of the aforesaid aligned holes, the said stud having a grooved shank portion of lesser diameter than the said shoulder and axially aligned therewith, the combined length of the shoulder and shank being less than that of the aligned holes; and a sheet metal clip member comprising a cup shaped head having a cylindrical body portion adapted to interfit the end of the other of the aforesaid aligned holes opposite to that containing the said stud member, and including a peripheral flange at the top thereof for engagement with the outer surface of one of the joined objects, the body portion having a cross-slotted bottom bent upon itself to form two pairs of yieldable trigger elements at a ninety degree angle to each other, each of the said trigger elements having an integral finger dependent therefrom adapted to receive the aforesaid stud shank therebetween, one pair of said dependent fingers being bent away from the longitudinal axis of the said clip to normally press against the wall of the aforesaid aligned holes, the other pair of said fingers being bent toward the said longitudinal axis and having laterally extending inwardly faced teeth at the lower end thereof normally engaged with the said shank groove to hold the said stud and clip in locked engagement, whereby the joined objects are rendered inseparable, the said toothed fingers being bent away from the longitudinal axis when the said yieldable trigger elements are depressed to disengage the said groove and release the aforesaid stud, thereby rendering the joined objects separable.

JULIUS HAJDU.

REFERENCES CITED

The following references are of record in the file of this patent:

UNITED STATES PATENTS

| Number | Name | Date |
|---|---|---|
| 245,908 | Wise | Aug. 16, 1881 |
| 303,731 | Heller | Aug. 19, 1884 |
| 1,686,780 | Wigginton | Oct. 9, 1928 |
| 2,295,444 | Woodward | Sept. 8, 1942 |

FOREIGN PATENTS

| Number | Country | Date |
|---|---|---|
| 758,355 | France | Jan. 15, 1934 |